(12) United States Patent
Stone et al.

(10) Patent No.: US 8,897,539 B2
(45) Date of Patent: Nov. 25, 2014

(54) USING IMAGES TO CREATE MEASUREMENTS OF STRUCTURES THROUGH THE VIDEOGRAMMETRIC PROCESS

(71) Applicant: Metalforming, Inc., Peachtree City, GA (US)

(72) Inventors: Geoffrey Stone, Peachtree City, GA (US); William Gaither Wilkins, Peachtree City, GA (US); Habib Fathi, Atlanta, GA (US); Ioannis Brilakis, Atlanta, GA (US)

(73) Assignee: Metalforming, Inc., Peachtree City, GA (US)

( * ) Notice: Subject to any disclaimer, the term of this patent is extended or adjusted under 35 U.S.C. 154(b) by 115 days.

(21) Appl. No.: 13/644,523

(22) Filed: Oct. 4, 2012

(65) Prior Publication Data

US 2013/0083990 A1    Apr. 4, 2013

Related U.S. Application Data

(60) Provisional application No. 61/543,167, filed on Oct. 4, 2011.

(51) Int. Cl.
*G06K 9/00* (2006.01)
*G06K 9/46* (2006.01)

(52) U.S. Cl.
CPC .......... *G06K 9/00208* (2013.01); *G06K 9/4638* (2013.01)
USPC ......................................... 382/145; 345/601

(58) Field of Classification Search
None
See application file for complete search history.

(56) References Cited

U.S. PATENT DOCUMENTS

| 6,154,578 | A | 11/2000 | Park et al. |
| 7,136,077 | B2 * | 11/2006 | D'Amora et al. ............. 345/601 |
| 2009/0141020 | A1 | 6/2009 | Freund |
| 2010/0110074 | A1 | 5/2010 | Pershing |
| 2011/0174128 | A1 | 7/2011 | Kroskey |

OTHER PUBLICATIONS

Bartoli, A., & Sturm, P. (2005). Structure-from-motion using lines: Representation, triangulation, and bundle adjustment. Computer Vision and Image Understanding, 100(3), 416-441.
Bay, H., Tuytelaars, T., & Van Gool, L. (2006). SURF: Speeded up robust features. Computer Vision—ECCV 2006, 404-417.
Chandraker, M., Lim, J., & Kriegman, D. (Sep. 2009). Moving in stereo: Efficient structure and motion using lines. In Computer Vision, 2009 IEEE 12th International Conference on (pp. 1741-1748). IEEE.
Coaker, L. H. (2009). Reflector-less total station measurements and their accuracy, precision and reliability. Dissertation, University of South Queensland.

(Continued)

*Primary Examiner* — Hadi Akhavannik
(74) *Attorney, Agent, or Firm* — Thomas | Horstemeyer, LLP

(57) ABSTRACT

According to various embodiments, a stream of image frames depicting a structure in a scene are obtained. The stream of image frames may comprise first image frames from a first imaging device and second image frames from a second imaging device. Using the first image frames and the second image frames, a wireframe of at least a portion of the structure is generated. From the wireframe, as-built dimensions may be identified, materials estimates may be determined, and/or data for a fabrication device may be generated, for example.

20 Claims, 8 Drawing Sheets

(56) References Cited

OTHER PUBLICATIONS

Goesele, M., Snavely, N., Curless, B., Hoppe, H., & Seitz, S. M. (Oct. 2007). Multi-view stereo for community photo collections. In Computer Vision, 2007. ICCV 2007. IEEE 11th International Conference on (pp. 1-8). IEEE.

Hartley, R. I. (1997). Lines and points in three views and the trifocal tensor. International Journal of Computer Vision, 22(2), 125-140.

Lowe, D. G. (2004). Distinctive image features from scale-invariant keypoints. International Journal of Computer Vision, 60(2), 91-110.

Pollefeys, M. et al. (2008). Detailed real-time urban 3d reconstruction from video. International Journal of Computer Vision, 78(2), 143-167.

Schindler, G., Krishnamurthy, P., & Dellaert, F. (Jun. 2006). Line-based structure from motion for urban environments. In 3D Data Processing, Visualization, and Transmission, Third International Symposium on (pp. 846-853). IEEE.

Taylor, C. J., & Kriegman, D. J. (1995). Structure and motion from line segments in multiple images. Pattern Analysis and Machine Intelligence, IEEE Transactions on, 17(11), 1021-1032.

Wang, Z., Wu, F., & Hu, Z. (2009). MSLD: A robust descriptor for line matching. Pattern Recognition, 42(5), 941-953.

Werner, T., & Zisserman, A. (2002). New techniques for automated architectural reconstruction from photographs. Computer Vision—ECCV 2002, 808-809.

PCT International Search Report received Jan. 23, 2013.

Lin, et al., "Non-Contact Monitoring System for Investigating As-Built Membrane Roof Structures" APRS, vol. XXXVI, Part 5, Dresden Sep. 25-27, 2006.

Sourimant, et al., "GPS, GIS and Video Registration for Building Reconstruction," 2007, retrieved on Nov. 20, 2012.

Cory, J. (2009), "Roofing contractors make use of a new estimating tool they say is safer and more accurate than hand-measuring: satellites", Replacement Contractor, May, www.replacementcontractoronline.com/industry-news.asp?sectionID=316>.

Gallup, D. (2011), "Efficient 3D reconstruction of a large-scale urban environments from street-level video", Dissertation, University of North Carolina.

Goesele, et al. (2007), "Mutli-view stereo for community photo collections", International Conference on Computer Vision, Seattle.

Khaleghi, B., Baklouti, M., & Karray, F. O. (Dec. 2009). SILT: scale-invariant line transform. In Computational Intelligence in Robotics and Automation (CIRA), 2009 IEEE International Symposium on (pp. 78-83). IEEE.

Pradeep, V., & Lim, J. (Jun. 2010). Egomotion using assorted features. In Computer Vision and Pattern Recognition (CVPR), 2010 IEEE Conference on (pp. 1514-1521). IEEE.

Tang, P., Akinci, B., & Huber, D. (2009). Quantification of edge loss of laser scanned data at spatial discontinuities. Automation in Construction, 18(8), 1070-1083.

\* cited by examiner

USING IMAGES TO CREATE MEASUREMENTS OF STRUCTURES THROUGH THE VIDEOGRAMMETRIC PROCESS

CROSS-REFERENCE TO RELATED APPLICATIONS

This application claims priority to U.S. provisional application entitled "Using Videogrammetry to Fabricate Parts" having application No. 61/543,167, filed Oct. 4, 2011, which is hereby incorporated by reference herein in its entirety.

BACKGROUND

Obtaining as-built dimensions of structures, such as roofs or other components of a building, may be required for various purposes. Conventional methods of obtaining as-built dimensions of a structure include manual measuring or surveying techniques. Manual measuring requires a worker to physically measure dimensions of the structure. The resulting measurements may be inaccurate, and workers may be placed in dangerous environments while measuring the structure. Surveying techniques may result in accurate measurements. However, surveying requires a trained technician and a stable platform from which to shoot.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Dimensions of structures, such as buildings, roofs, windows, or other planar components of buildings, may be needed for various purposes. In accordance with the present disclosure, as-built dimensions of a structure may be obtained from a series of corresponding pairs of images. As a non-limiting example, an imaging set comprising a pair of imaging devices is calibrated and used to film a structure in a scene. The images are transmitted from a client computing device to a server computing device for processing. From the series of images, a three-dimensional wireframe of the structure is generated. The server computing device then determines dimensions of the structure from the three-dimensional wireframe and transmits the dimensions to the client. The dimensions obtained from the server computing device may be used to fabricate parts for the structure. In addition, an estimate regarding materials for the structure may be determined. Even further, the server computing device may use the wireframe to generate fabrication data for a fabrication device. In the following discussion, a general description of the system and its components is provided, followed by a discussion of the operation of the same.

Figure 1:
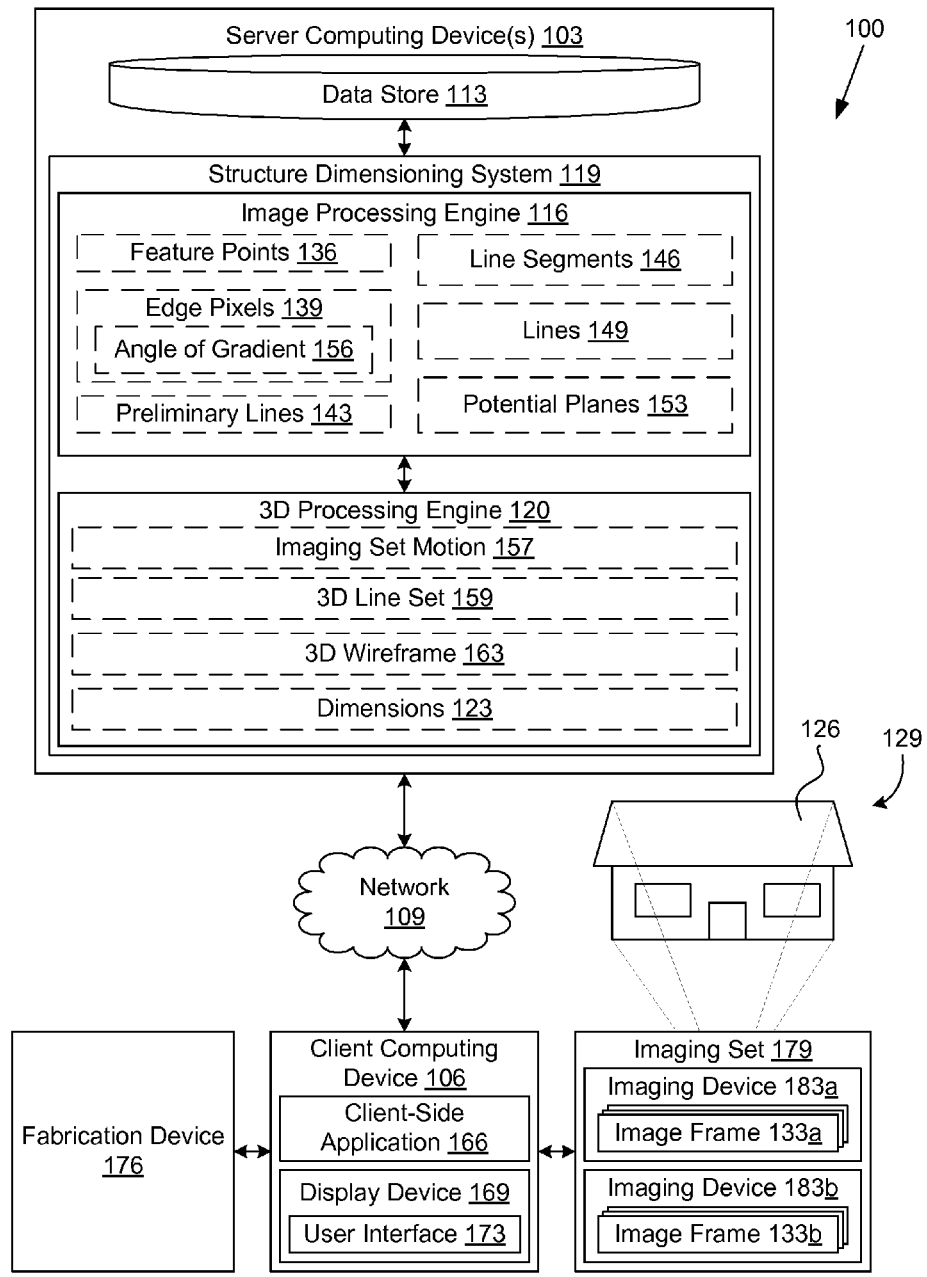
FIG. 1 is a drawing of a networked environment according to various embodiments of the present disclosure.

With reference to FIG. 1, shown is a networked environment 100 according to various embodiments. The networked environment 100 includes a server computing device 103 and a client computing device 106 coupled to a network 109. The network 109 includes, for example, the Internet, intranets, extranets, wide area networks (WANs), local area networks (LANs), wired networks, wireless networks, or other suitable networks, etc., or any combination of two or more such networks. It is noted that, although the following discussion references a networked environment, the functionality described may be performed on one or more devices without employing a network. For example, the functionality described below as being performed on the server computing device 103 and client computing device 106 separately may be performed by a single computing device. Additionally, some or all of the functionality described as being performed on the server computing device 103 may instead be performed on the client computing device 109, and some or all of the functionality described as being performed on the client computing device 106 may instead be performed on the server computing device 103, according to various embodiments.

The server computing device 103 may comprise, for example, a server computer or any other system providing computing capability. Alternatively, a plurality of server computing devices 103 may be employed that are arranged, for example, in one or more server banks or computer banks or other arrangements. For example, a plurality of server computing devices 103 together may comprise a cloud computing resource, a grid computing resource, and/or any other distributed computing arrangement. Such server computing devices 103 may be located in a single installation or may be distributed among many different geographical locations. For purposes of convenience, the server computing device 103 is referred to herein in the singular. Even though the server computing device 103 is referred to in the singular, it is understood that a plurality of server computing devices 103 may be employed in various arrangements.

Various applications and/or other functionality may be executed in the server computing device 103 according to various embodiments. Also, various data is stored in a data store 113 that is accessible to the server computing device 103. The data store 113 may be representative of a plurality of data stores, as can be appreciated. The data stored in the data store 113, for example, is associated with the operation of the various applications and/or functional entities described below.

The components executed on the server computing device 103, for example, include a structure dimensioning system 119, and possibly other applications, services, processes, systems, engines, or functionality not discussed in detail herein. The structure dimensioning system 119 may comprise an image processing engine 116, a 3D processing engine 120, and possibly other features.

The image processing engine 116 is executed to process images in order to facilitate obtaining dimensions 123 of a structure 126 located in a scene 129. To this end, the image processing engine 116 may obtain a series of image frames 133a-133b and determine, calculate, and/or create feature points 136, edge pixels 139, preliminary lines 143, line segments 146, lines 149, potential planes 153, and potentially other information.

Feature points 136 may be one or more pixels in an image frame 133a-133b that may be useful in determining characteristics associated with one or more of the image frames 133a-133b. Edge pixels 139 are one or more pixels that may correspond to a physical edge that is represented in an image frame 133a-133b. Each edge pixel 139 may have an angle of gradient 156. The angle of gradient 156 may be associated with a local intensity gradient of the edge pixel 139 in two or more directions. For example, angle of gradient 156 may be defined as follows:

$$\alpha = \tan^{-1}(dy/dx),$$

where $\alpha$ is the angle of gradient 156, and dy and dx are the local intensity gradients in the y and x directions, respectively.

Preliminary lines 143 may be several edge pixels 139 that have similar angles of gradient 156 and that are aligned in a relatively straight formation. Line segments 146 are preliminary lines 143 that have been shortened. A line 149 is defined herein as a line segment 146 that has been extended by, for example, being combined with one or more other line segments 146 that have similar angles of gradient 156. Potential planes 153 are portions of an image frame 133a-133b that have been determined as possibly depicting a physical plane in the scene 129.

The 3D processing engine 120 may obtain data from the image processing engine 116 and determine, calculate, and/or create imaging set motion 157, 3D line sets 159, 3D wireframes 163, and dimensions 123. Imaging set motion 157 may be movement of the source of the imaging frames 133a-133b that results in the views depicted in a series of image frames 133a-133b being changed. For example, imaging set motion 157 may be due to a worker moving a camera while a series of image frames 133a-133b are being collected.

The 3D line sets 159 may be lines 149 that have been matched and transformed from a two-dimensional space to a three-dimensional space. The 3D wireframes 163 may be based at least in part on the 3D line sets 159 that have been fit to one or more polygons. The dimensions 123 may be, for example, relative or metric one-dimensional, two-dimensional, or three-dimensional dimensions that correspond to expected measurements of a structure 126.

The client computing device 106 is representative of a plurality of client computing devices 106 that may be coupled to the network 109. The client computing device 106 may comprise, for example, a processor-based system such as a computer system. Such a computer system may be embodied in the form of a desktop computer, a laptop computer, a personal digital assistant, a cellular telephone, a web pad, a tablet computer system, or other device with like capability.

The client computing device 106 may be configured to execute various applications such as a client-side application 166 and/or other applications. The client computing device 106 may be configured to execute applications beyond the client-side application 166, such as, for example, browsers, email applications, instant message applications, and/or other applications.

The client computing device 106 may include a display device 169 for rendering or displaying a user interface 173.

The display device 169 may comprise one or more devices such as cathode ray tubes (CRTs), liquid crystal display (LCD) screens, gas plasma-based flat panel displays, LCD projectors, or other devices of like capability. The user interface 173 displays information and facilitates operating and controlling the client computing device 106.

The client computing device 106 may also be coupled to a fabrication device 176, an imaging set 179, and possibly other devices or peripherals. The fabrication device 176 may be any type of device, such as a Computer Numerical Control (CNC) machine, that is capable of receiving or creating a set of data or instructions and fabricating, making, or modifying a structure 126, component, part, or any other item. For example, the fabrication device 176 may be that which is described in U.S. patent application Ser. No. 12/688,971, filed on Jan. 18, 2010, which is incorporated by reference herein in its entirety.

The imaging set 179 may be an apparatus that comprises a pair of imaging devices 183a-183b. As a non-limiting example, the imaging set 179 may comprise an extendable aluminum pole with straps attached towards the bottom of the pole. A mount for the imaging devices 183a-183b may be at the top of the pole, and the straps may be configured to be worn by a worker. The straps may act as a harness for the worker to conveniently carry the pole around the scene 129 in order to film the structure 126. Additionally, the imaging set 179 may comprise a support or holder for the client computing device 106.

The mount for the imaging device 183a-183b may support and provide a platform for the imaging devices 183a-183b. The mount may be fixed so that the relative positions of the imaging devices 183a-183b may not be modified. In an alternative embodiment, the mount may be adjustable so that the relative angle and distance between the imaging devices 183a-183b, and possibly other characteristics, may be adjusted.

The imaging devices 183 may be embodied in the form of video cameras, still cameras, visible-light receiving devices, infrared light receiving devices, or any other types of imaging devices. In one embodiment, a pair of Flea®2 camera systems are used as imaging devices 183. The Flea®2 camera system may be available from Point Grey Research USA, Inc., 13749 E. Charter Oak Drive, Scottsdale, Ariz., USA, 85259-2322. It is noted that, when referring to a single imaging device 183a-183b, the present disclosure will reference the device as "imaging device 183a" or "imaging device 183b." Alternatively, when referring to more than one imaging device 183a-183b, the present disclosure will reference the devices as "imaging devices 183."

Each imaging device 183a and 183b may output a series of image frames 133a and 133b, respectively. It is noted that, when referring to a single image frame 133a-133b, the present disclosure will reference the frame as "image frame 133a" or "image frame 133b." Alternatively, when referring to a pair of image frames 133a-133b from both imaging devices 183, the present disclosure will reference the frames as "image frames 133." Furthermore, it is emphasized that the image frame 133a corresponds to the imaging device 183a, while the image frame 133b corresponds to the imaging device 183b. In addition, each image frame 133a corresponds to one image frame 133b. The corresponding image frames 133 may have been obtained by their respective imaging devices 183 during the same period of time.

The imaging set 179 may be used to capture image frames 133 of the structure 126 in a scene 129. The structure 126 may be, for example, a building, infrastructure, or any portion or component thereof. For example, the structure 126 may be a roof of a building. The scene 129 may be the area or environment surrounding the structure 126 that may be captured by the imaging set 179.

Next, a general description of the operation of the various components of the networked environment 100 is provided. To begin, the imaging set 179 obtains a stream of image frames 133 of a calibration object. For example, the calibration procedures described in Z. Zhang, "Flexible Camera Calibration by Viewing a Plane from Unknown Orientations," available at http://www.vision.caltech.edu/bouguetj/calib_doc/papers/zhan99.pdf; J. Heikkilä, O. Silvén, "A Four-Step Camera Calibration Procedure with Implicit Image Correction," IEEE Computer Vision and Pattern Recognition, (1997) 1106-1112; J. Y. Bouguet, "Camera Calibration Toolbox for Matlab," available at http://www.vision.caltech.edu/bouguetj/calib_doc; and/or other procedures may be used. These documents are incorporated by reference herein in their entireties. In an alternative embodiment, calibration may be performed after the imaging set 179 is constructed, and the resulting calibration data may be retained for future use.

After obtaining image frames 133 of the calibration object, a stream of image frames 133 of the structure 126 is obtained by the imaging set 179 and transmitted to the client computing device 106. Thereafter, the client computing device 106 transmits the image frames 133 of the calibration object and the structure 126 through the network 109 to the server computing device 103.

After obtaining the image frames 133, calibration processing is performed using the image frames 133 associated with the calibration object. From the calibration processing, intrinsic and extrinsic parameters of the imaging set 179 may be determined. The intrinsic parameters may be the focal length, image format, principal point, lens distortion, and/or possibly other parameters. The extrinsic parameters may be a rotation matrix, translation vector, and/or other parameters associated with the imaging set 179.

The image processing engine 116 then obtains data associated with the first image frame 133a of the structure 126. Feature points 136 of the image frame 133a are detected and then matched with corresponding feature points 136 on the corresponding first image frame 133b. To detect feature points 136, techniques such as those described in H. Bay, A. Ess, T. Tuytelaars, L. V. Gool, "Speeded-Up Robust Features (SURF)," Computer Vision-ECCFV 2006, Lecture Notes in Computer Science, Springer, 3951 (2006) 404-417; D. Lowe, "Distinctive Image Features from Scale-Invariant Keypoints," International Journal of Computer Vision, 60(2) (2004) 91-110; E. Tola, V. Lepetit, P. Fua, "Daisy: An Efficient Dense Descriptor Applied to Wide Baseline Stereo," PAMI, 32(5) (2010) 815-830; and/or other techniques may be used. These documents are incorporated by reference herein in their entireties.

Edge pixels 139 in the first image frame 133a are then detected, and grouped by their corresponding angles of gradient 156. Edge pixels 139 may be detected, for example, by using the techniques described in J. Canny, "A Computational Approach to Edge Detection," IEEE Transactions on Pattern Analysis and Machine Intelligence, 8(6) (1986) 679-698; F. Bergholm, "Edge Focusing," IEEE Trans. Pattern Anal. Machine Intell., 9(6) (1987) 726-741; J. M. Brady, S. M. Smith, "SUSAN: A New Approach to Low-Level Image Processing," Defense Research Agency, 1995; O. P. Verma, M. Hanmandlu, P. Kumar, S. Chhabra, A. Jindal, "A Novel Bacterial Foraging Technique for Edge Detection," Pattern Recognition Letters, 32(8) (2011) 1187-1196; and/or other techniques. These documents are incorporated by reference herein in their entireties.

As described above, an angle of gradient 156 may be defined, for example, as:

$$\alpha = \tan^{-1}(dy/dx)$$

where $\alpha$ is the angle of gradient 156, and dy and dx are the local intensity gradients in the y and x directions, respectively. The local intensity gradients may be determined, for example, as described in H. Scharr, "Optimal Operators in Digital Image Processing," Dissertation, 2000, which is incorporated by reference herein in its entirety.

The edge pixels 139 may then be grouped based at least in part on their angles of gradient 156. From the grouped edge pixels 139, preliminary lines 143 are determined. The preliminary lines 143 may comprise, for example, connected edge pixels 139 having approximately equal angles of gradient 156 that, when the edge pixels 139 are combined, form an approximately straight preliminary line 143. Other techniques of creating preliminary lines 143 may be applied.

The preliminary lines 143 may then be shortened to create line segments 146. As a specific non-limiting example, a preliminary line 143 may be shortened so that the remainder of the preliminary line 143 is entirely located on the physical line that is depicted in the image frame 133a. Then, the line segments 146 may be lengthened until they reach a predefined criteria. As a non-limiting example, the line segment 146 may be lengthened based at least in part on edge pixels 139 that are along the direction of the shortened preliminary line 143 and have approximately the same angle of gradient 156 as the line segment 146. In such an embodiment, the line segment 146 may be lengthened until an edge pixel 139 at the end of the line segment 146 has an angle of gradient 156 that falls outside a predetermined threshold.

After the line segments 146 have been lengthened, lines 149 may be created by combining the lengthened line segments 146. For example, line segments 146 that have been lengthened, have approximately the same angle relative to the image frame 133a, comprise pixels of approximately the same angle of gradient 156, are aligned with the lengthened line segment 146, and/or possibly meet other criteria may be combined. The process of combining lengthened line segments 146 may be repeated until the resulting lines 149 reach a predefined limit. Such a limit may be based at least in part on a homography matrix of a plane depicted in image frame 133a, dense point matching results, an intensity histogram of pixels near the line 149, and/or other information. It is understood that although referenced as a homography matrix herein, other data structures representing homography may be applied.

After the lines 149 have been created, the feature points 136 that have been matched across corresponding image frames 133 may be used to determine potential planes 153 that may be depicted in the image frame 133a. To this end, a RANdom Sample Concensus (RANSAC) approach or other approaches may be applied. In applying the RANSAC approach, four pairs of matched feature points 136 are randomly selected from the set of available feature point 136 pairs between the two image frames 133. Assuming that the selected feature point 136 pairs are on a depicted plane, the corresponding homography matrix is calculated and tested for the remaining pairs in the set of feature point pairs. The number of pairs that satisfy the mathematical constraint resulting from the calculated homography matrix is counted and considered a consensus. This process may be repeated for a predetermined number of iterations. After the iterations have been completed, the calculated homography matrix that has the maximum consensus may be selected as representing a potential plane 153. Then, the feature points 136 corresponding to the potential plane 153 are removed from the initial set of feature point 136 pairs, and the process described above may be repeated. The entire process may be repeated until the supporting feature points 136 for the next homography matrix is fewer than a predefined threshold.

After the potential planes 153 have been determined, the lines 149 that were created in the image frame 133a are matched to the corresponding image frame 133b. The lines 149 may be matched, for example, based at least in part on the homography matrix associated with the potential planes 153, the number of edge pixels 139 and their corresponding angles of gradient 156 that are near the projected lines 149, a dense point matching process (e.g., graph cut, block matching, or other dense point matching processes), intensity histograms, and/or other information. The process described above may be repeated for all pairs of image frames 133.

Next, the imaging set motion 157 between the successive pairs of image frames 133 may be determined. To this end, successive pairs of image frames 133 (i.e. four image frames 133) may be obtained, and two 3×3×3 trifocal tensors may be calculated from the image frames 133 as follows. As a non-limiting example, projection matrices for the four image frames 133 may be represented as follows:

$$P_A = K_A \cdot [I|0], P_B = K_B \cdot [R_0|t_0], P_C = K_A \cdot [R|t], \text{ and}$$
$$P_D = K_B \cdot [R_0 R | R_0 t + t_0],$$

where $P_A$-$P_D$ are projection matrices of the four image frames 133, $K_A$ and $K_B$ are matrices representing the intrinsic parameters of imaging devices 183a and 183b, I is an identity matrix, $R_0$ is a rotation matrix determined during calibration, $t_0$ is a translation vector determined during calibration, R is a rotation matrix corresponding to the imaging set motion 157 with respect to two successive image frames 133a, and t is a translation vector corresponding to the imaging set motion 157 with respect to two successive image frames 133a.

As such, two trifocal tensors, each corresponding to one of the image devices 183, may be defined as follows:

$$T_i^{L^{qr}} = (-1)^{i+1} \cdot \det \begin{pmatrix} \sim a^i \\ b^q \\ c^r \end{pmatrix},$$

$$T_i^{R^{qr}} = (-1)^{i+1} \cdot \det \begin{pmatrix} \sim a^i \\ b^q \\ d^r \end{pmatrix},$$

where $\sim a^i$ is $P_A$ without row i and $b^q$, $c^r$, and $d^r$ is the $q^{th}$ row of $P_B$, the $r^{th}$ row of $P_C$, and the $r^{th}$ row of $P_D$, respectively.

By solving a system of linear equations, preliminary calculations of R and t, which define the imaging set motion 157, may be determined. For example, the process described in R. Hartley, A. Zisserman, "Multiple View Geometry in Computer Vision, Second Edition," Cambridge University Press, Cambridge, 2003 may be used. This document is incorporated by reference herein in its entirety. Additionally, the imaging set motion 157 collected from other subsequent image frames 133 may applied in a global optimization process to find the optimum values of R and t.

The imaging set motion 157 data may be used to further update the end points of the matched lines 149, for example, by using mathematical constraints (e.g., epipolar geometry, homography matrices, and/or various geometric considerations), and/or possibly other factors. The structure dimensioning system 119 may also identify planes in the image frames 133a-133b to further refine and update the end points of the matched lines 149. To this end, partial-planes in the image frames 133a-133b may be identified and then merged into whole planes. Using the whole planes, the end points of the matched lines 149 may be refined and/or updated.

Additionally, the calculated imaging set motion 157 may be used to convert the 3D coordinates of the lines 149 from their local coordinate system to a global coordinate system. Various methods may be used to transform the matched lines 149 to a 3D line set 159 that corresponds to the structure 126. As a non-limiting example, for each pair or triplet of matched lines 149, linear or non-linear triangulation methods may be applied to obtain a 3D line set 159.

Further, the end points of the 3D line sets 159 may be refined using a hybrid bundle adjustment, for example. At time i, the projection matrices $P_L^i$ and $P_R^i$ for the imaging devices 183a and 183b, respectively, can be represented using:

$$R_L^i = \frac{1}{e_i^2 + f_i^2 + g_i^2 + h_i^2} \times$$
$$\begin{bmatrix} e_i^2 + f_i^2 - g_i^2 - h_i^2 & 2f_i g_i - 2e_i h_i & 2f_i g_i + 2e_i g_i \\ 2f_i g_i + 2e_i h_i & e_i^2 - f_i^2 + g_i^2 - h_i^2 & 2g_i h_i - 2e_i f_i \\ 2f_i h_i - 2e_i g_i & 2g_i h_i + 2e_i g_i & e_i^2 - f_i^2 - g_i^2 + h_i^2 \end{bmatrix},$$

$$P_L^i = K_L[R_L^i | t_L^i], \text{ and}$$
$$P_R^i = K_L[R_L^i R | R_L^i t + t_L^i],$$

where $R_L^1$ and $t_L^1$ are the rotation matrix and translation vector for one of the imaging devices 183a or 183b at time i, $e_i^2 + f_i^2 + g_i^2 + h_i^2$ is the quaternion representation of $R_L^1$, and R and T are the extrinsic calibration information for the imaging set 179. Knowing the projection matrices from the imaging devices 183a-183b at time i, the 2D image coordinates and 3D points projected into the image frames 133a-133b may be determined. For instance, if the j-th 3D point is denoted by $N_j = [X\ Y\ Z\ W]^t$, homogeneous coordinates of its projection to the image frames 133a-133b can be represented as:

$$n_L^{ij} = P_L^i N_j \text{ and } n_R^{ij} = P_R^i N_j,$$

where $n_L^{ij}$ and $n_R^{ij}$ are the homogenous coordinates for the image frame 133a and the image frame 133b, respectively.

In Plucker coordinates, the k-th 3D line $L_k$ can be parameterized by orthonormal representation. To this end, four optimization parameters may be used for each 3D line in the 3D line set 159. Thus, a duality between points and the 3D lines in the 3D line sets 159 may be created. From this relationship, homogeneous coordinates of the projection of the k-th 3D line in the 3D line set 159 may be calculated using:

$$l_L^{ik} = \tilde{P}_L L_K \text{ and } l_R^{ik} = \tilde{P}_R L_K,$$

where $l_L^{ik}$ and $l_R^{ik}$ are the homogenous coordinates of the projection for the imaging device 183a and the image device 183b, respectively, and $\tilde{P} = (\det(\overline{P})(\overline{P}^{-T})|[p]_x \overline{P})$.

From the 3D line set 159, plane boundaries may be determined, for example, by using data associated with the potential planes 158. Also, polygons may be fit to the boundaries. With polygons fit to all of the boundaries, a 3D wireframe 163 of the structure 126 may be obtained. From the 3D wireframe 163 of the structure 126, as-built dimensions 123 of the structure 126 or portions of the structure 126 may be extracted. Additionally, materials estimates, such as the quantity or cost of a material for the structure may be determined. For instance, it may be determined that N square feet of a material would be needed to replace a portion of the structure 126, and that the estimated cost for the material would be M, where N and M are the calculated materials estimates.

The server computing device 103 may also use the 3D wireframe 163 to generate data for the fabrication device 176 and transmit the data to the client computing device 106. The client computing device 106 may then supply the fabrication device 176 with the data, and one or more components or parts may be fabricated, as can be appreciated.

Figure 2:
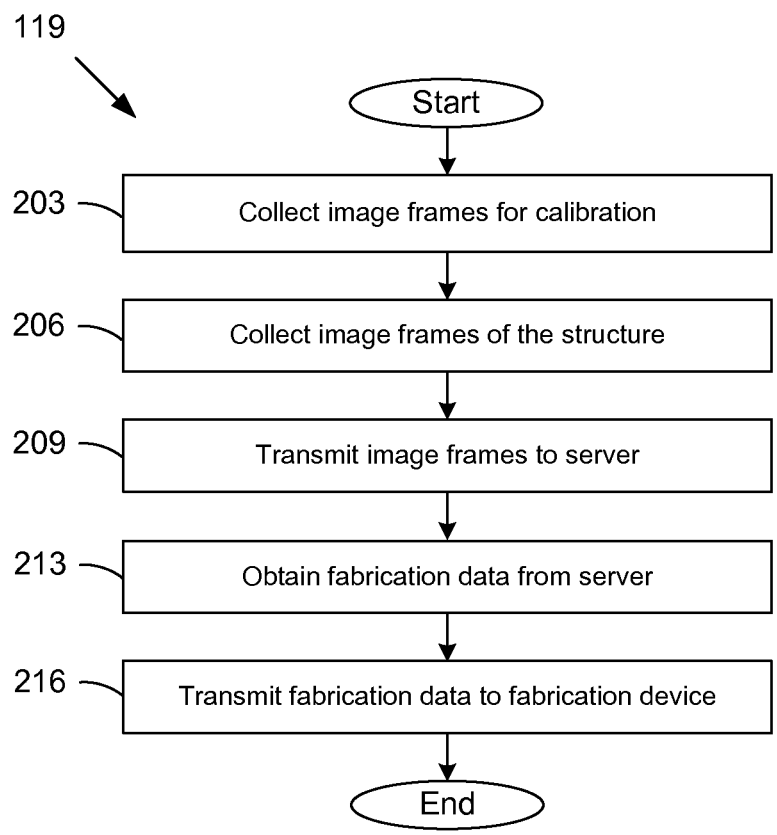
FIG. 2 is a flowchart illustrating one example of functionality implemented as portions of a client-side application executed in a client computing device in the networked environment of FIG. 1 according to various embodiments of the present disclosure.

Referring next to FIG. 2, shown is a flowchart that provides one example, among others, of the operation of a portion of the client-side application 166 according to various embodiments. It is understood that the flowchart of FIG. 2 provides merely an example of the many different types of functional arrangements that may be employed to implement the operation of the portion of the client-side application 166 as described herein. As an alternative, the flowchart of FIG. 2 may be viewed as depicting an example of steps of a method implemented in the client computing device 106 (FIG. 1) according to one or more embodiments.

Beginning with box 203, the client-side application 166 collects image frames 133 (FIG. 1) of a calibration object. As discussed above, in an alternative embodiment, the calibration data may be obtained after constructing the imaging set 179, and the calibration data may be retained for future use.

Next, as depicted in box 206, the client-side application 166 collects image frames 133 of the structure 126 (FIG. 1). Thereafter, the client-side application 166 transmits the collected image frames 133 to the server computing device 103 (FIG. 1), as shown in box 209.

After transmitting the image frames 133, the client-side application 166 waits until it has obtained fabrication data from the server computing device 103, as depicted in box 213. In an alternative embodiment, the dimensions 123 (FIG. 1) are obtained by the client-side application 166, and the client-side application 166 or fabrication device 176 generates the fabrication data. Next, as shown in box 216, the client-side application 166 transmits the fabrication data to the fabrication device 176, where a component may be fabricated, for example. Thereafter, the process ends.

Referring next to FIGS. 3A-3E, shown is a flowchart that provides one example of the operation of a portion of the structure dimensioning system 119 according to various embodiments. It is understood that the flowchart of FIGS. 3A-3E provides merely an example of the many different types of functional arrangements that may be employed to implement the operation of the portion of the structure dimensioning system 119 as described herein. As an alternative, the flowchart of FIGS. 3A-3E may be viewed as depicting an example of steps of a method implemented in the server computing device 103 (FIG. 1) according to one or more embodiments.

Figure 3A:
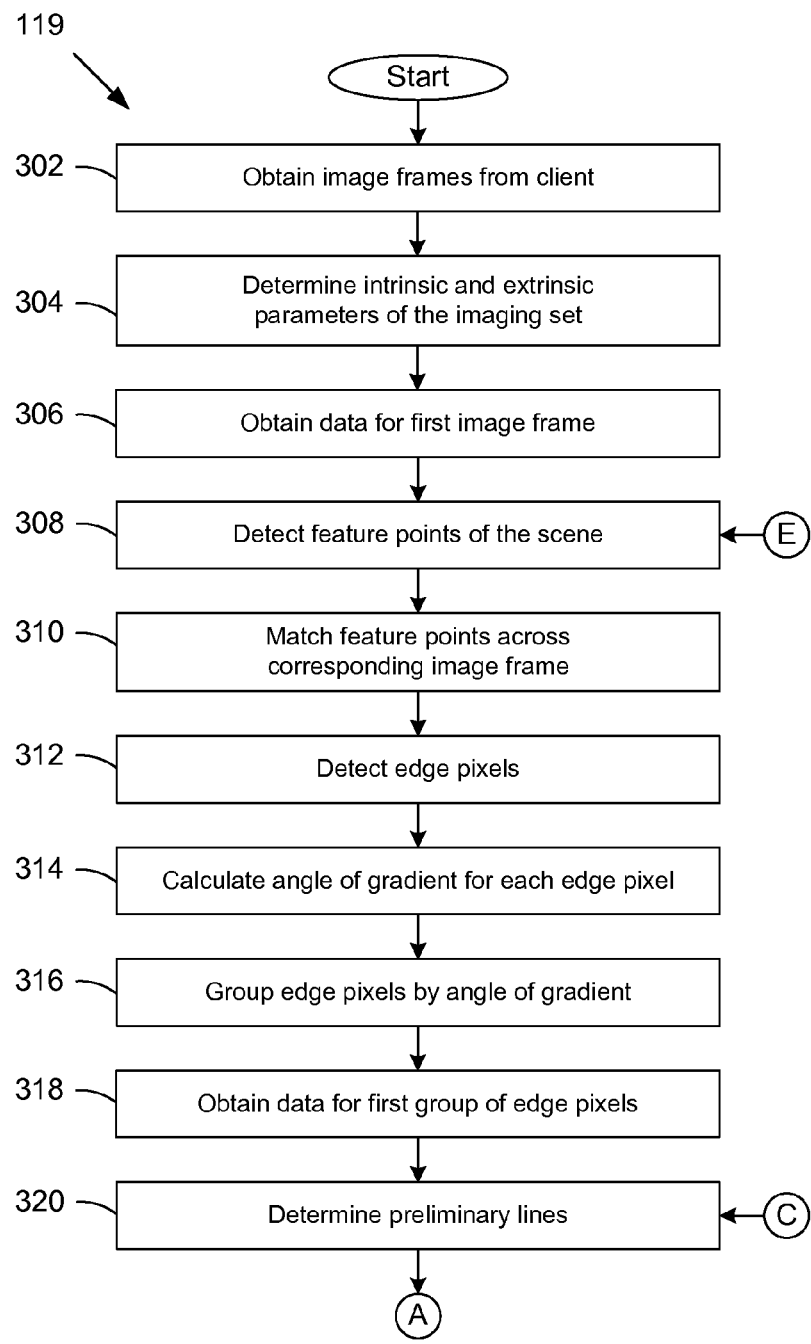
FIGS. 3A-3E is a flowchart illustrating one example of functionality implemented as portions of a structure dimensioning system executed in a server computing device in the networked environment of FIG. 1 according to various embodiments of the present disclosure.

With reference to FIG. 3A, the structure dimensioning system 119 begins by obtaining a stream of image frames 133 (FIG. 1) from the client computing device 106 (FIG. 1), as shown in box 302. As described above, the stream of image frames 133 may include image frames 133 corresponding to the calibration object and the structure 126.

Next, as shown in box 304, the structure dimensioning system 119 then determines the intrinsic and extrinsic parameters of the imaging set 179 (FIG. 1). The intrinsic parameters may be, for example, the focal length, image format, principal point, lens distortion, and possibly other parameters. The extrinsic parameters may be, for example, a rotation matrix, translation vector, and/or other parameters associated with the imaging set 179.

As shown in box 306, the structure dimensioning system 119 then obtains the data for the first image frame 133a of the series of image frames 133 corresponding to the structure 126. Next, feature points 136 of the scene 129 (FIG. 1) are identified, as depicted in box 308. After the feature points 136 have been identified, as shown in box 310, the feature points 136 depicted in the image frame 133a are matched across the corresponding image frame 133b.

As depicted in box 312, the structure dimensioning system 119 then identifies the edge pixels 139 (FIG. 1) in the image frame 133a and calculates their associated angles of gradient 156 (FIG. 1), as shown in box 314. The structure dimensioning system 119 then moves to box 316 and groups the edge pixels 139 by their angles of gradient 156.

Next, as shown in box 318, the structure dimensioning system 119 then obtains the data for the first group of edge pixels 139. From the group of edge pixels 139, preliminary lines 143 are identified, as shown in box 320.

Figure 3B:
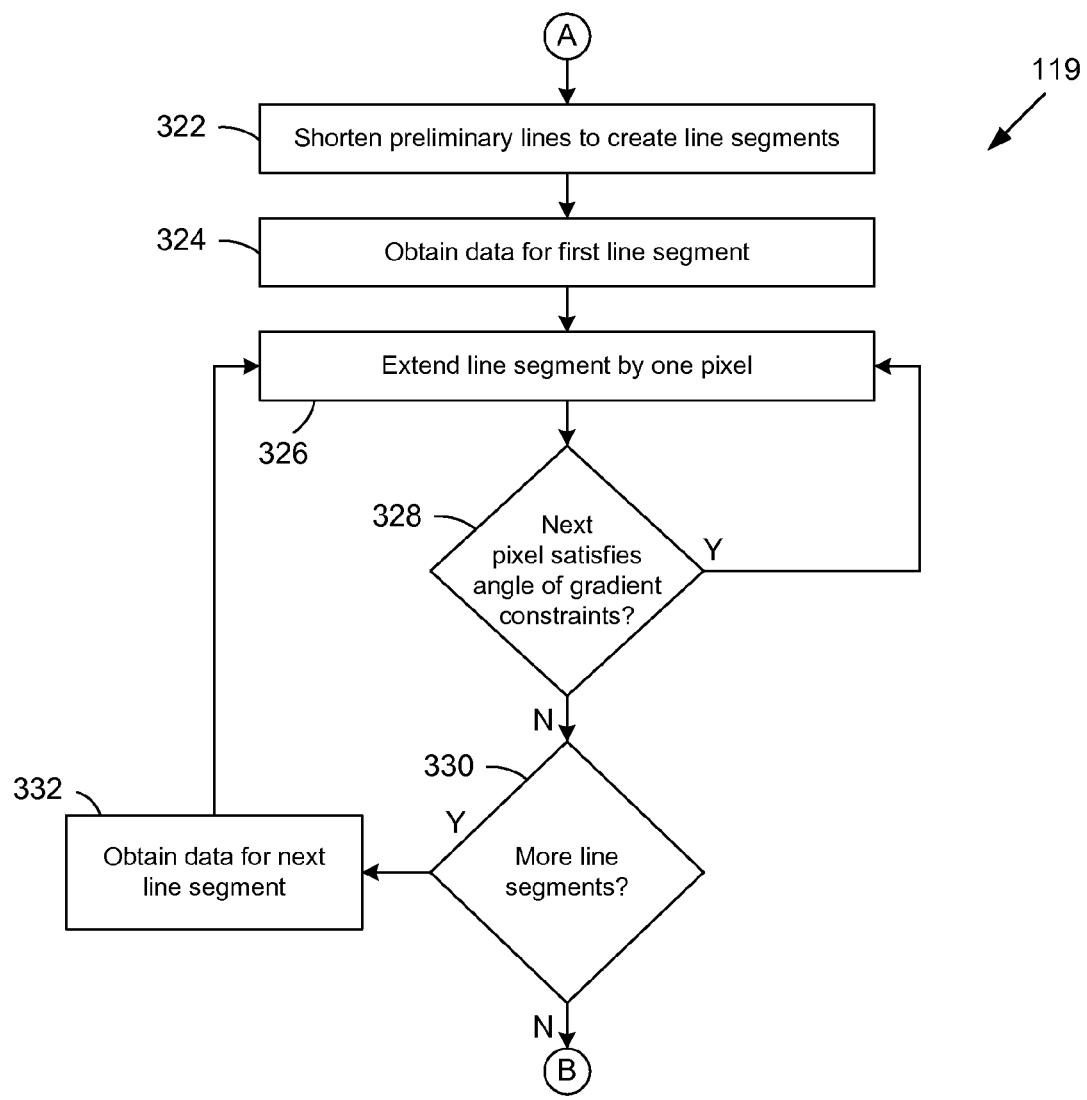

Turning to FIG. 3B, the structure dimensioning system 119 then moves to box 322 and shortens the preliminary lines 143 (FIG. 1) to create the line segments 146 (FIG. 1). As described above, the preliminary lines 143 may be shortened so that the remaining preliminary line 143 is entirely and accurately located on the depicted physical line that is in the image frame 133a. Next, the structure dimensioning system 119 obtains the data for the first line segment 146, as shown in box 324, and extends the line segment 146 by one pixel, as depicted in box 326. Next, as shown in box 328, the structure dimensioning system 119 determines whether the next pixel that may contribute to extending the line segment 146 would satisfy one or more predefined constraints associated with its angle of gradient 156 (FIG. 1). As a non-limiting example, such a constraint may be that the edge of gradient 156 must fall within a specified threshold. If the predetermined constraints are satisfied, the structure dimensioning system 119 repeats boxes 326-328 as shown. If the constraints are not satisfied, it is determined whether there are any more line segments 146 for which to perform the extending process, as shown in box 330. If so, as shown in box 332, the structure dimensioning system 119 obtains the data for the next line segment 146 and repeats boxes 326-330, as shown. Once all of the line segments 146 of the group of edge pixels 139 (FIG. 1) have been extended, the structure dimensioning system 119 moves to box 334 (FIG. 3C).

Figure 3C:
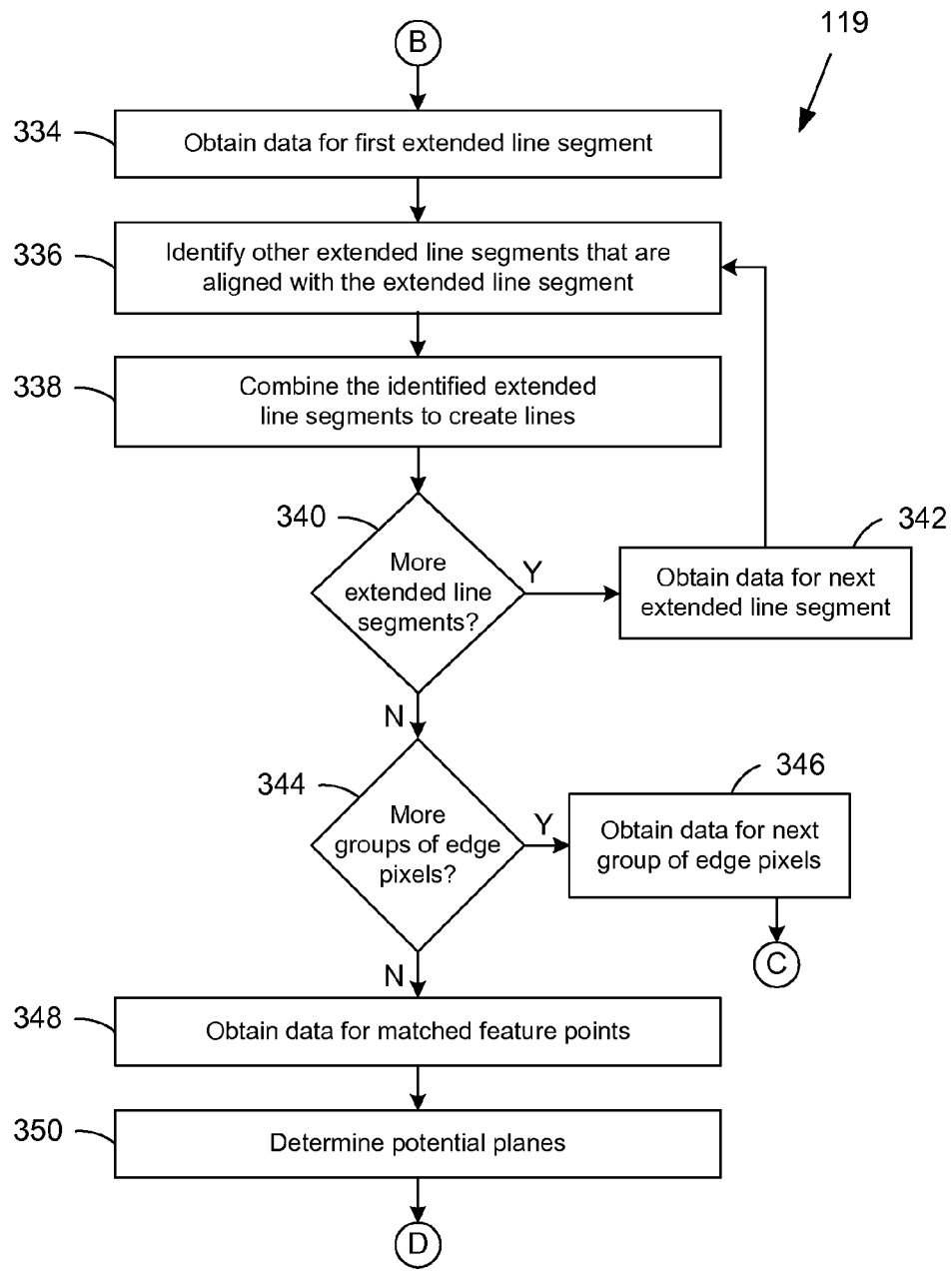

Referring now to FIG. 3C, the structure dimensioning system 119 then obtains the data for the first extended line segment 146 (FIG. 1), as shown in box 334. Next, other line segments 146 that are aligned with the extended line segment 146 are identified, as shown in box 336, and combined to create lines 149 (FIG. 1), as depicted in box 338.

The structure dimensioning system 119 then determines whether there are additional line segments to process, as shown in box 340. If there are additional line segments 146 to process, the data for the next extended line segment 146 is obtained, as shown in box 342, and boxes 336-340 are repeated at shown.

Once all of the extended line segments 146 have been processed, it is determined whether there are additional groups of edge pixels 139 (FIG. 1) to process, as depicted in box 344. If so, the structure dimensioning system 119 obtains data for the next group of pixels, as shown in box 346, and boxes 320-344 are repeated as shown in FIGS. 3A-3C.

Once all of the groups of edge pixels 139 have been processed, the data for the matched feature points 136 (FIG. 1) (determined in box 310 of FIG. 3a) is obtained, as shown in box 348. As depicted in box 350, the structure dimensioning system 119 then identifies potential planes 153 (FIG. 1). As explained above, a RANSAC approach, for example, may be applied to identify the potential planes 153.

Figure 3D:
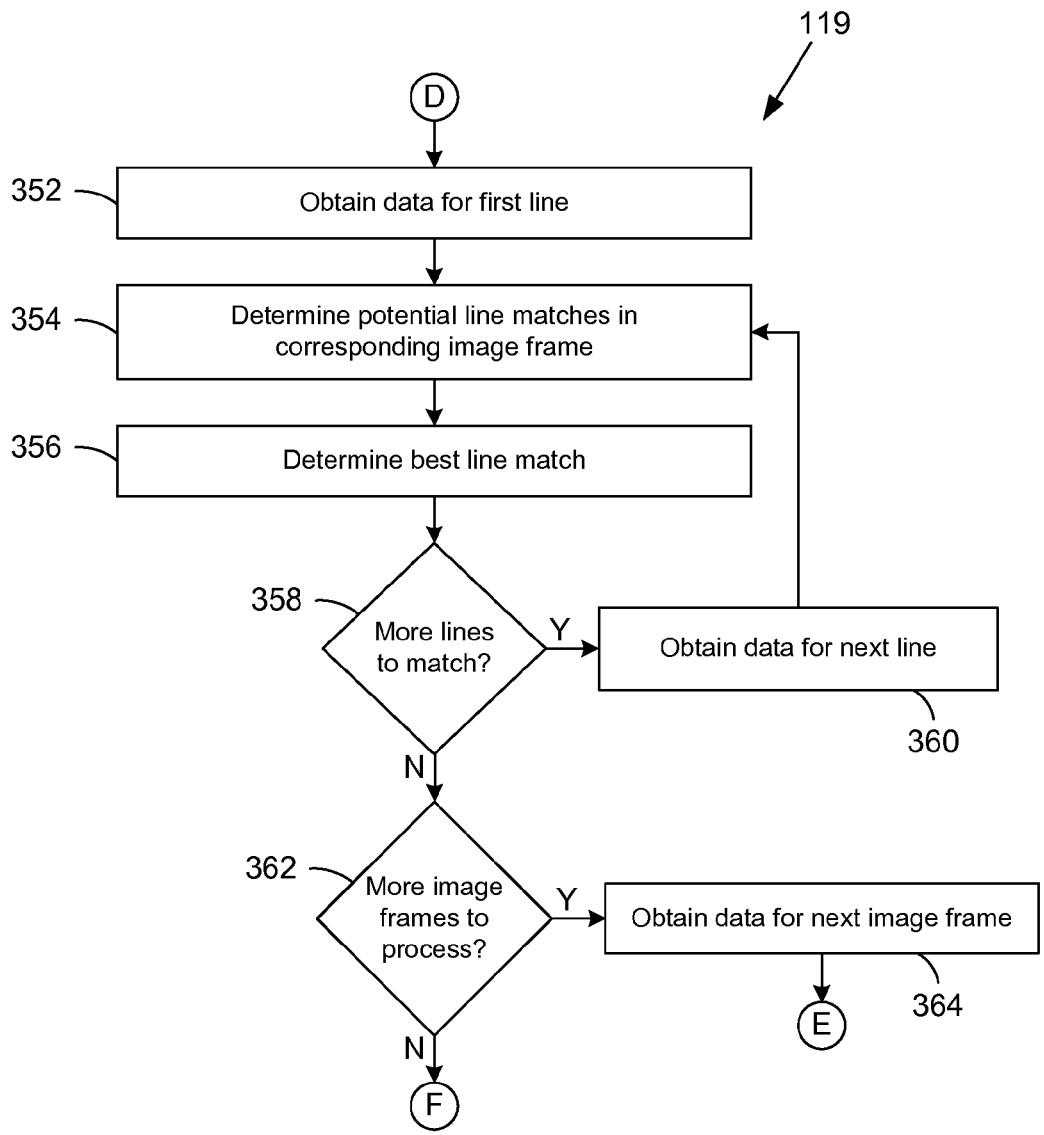

Turning to FIG. 3D, the structure dimensioning system 119 then obtains the data for the first line 149 (determined in box 338 of FIG. 3C), as shown in box 352. As depicted in box 354, the structure dimensioning system 119 then identifies potential line 149 matches for the corresponding image frame 133b. As discussed above, the potential line matches may be based at least in part on the potential planes 153 (FIG. 1) (determined in box 336c of FIG. 3C) or other information. Next, as shown in box 356, the best line 149 matches are identified. The best line 149 match may be based at least in part on edge pixels 139 (FIG. 1) and their corresponding angles of gradient 156 (FIG. 1), a dense point matching process, an intensity histogram, and/or possibly other factors.

As shown in box 358, it is then determined whether there are more lines 149 to match. If so, the data for the next line 149 is obtained, as shown in box 360, and boxes 354-358 are repeated as shown.

Once all the lines 149 have been matched from image frame 133a to image frame 133b, the structure dimensioning system 119 moves to box 362 and determines whether there are more image frames 133a to process. If so, the data for the next image frame 133a is obtained, as shown in box 364, and boxes 308-362 (FIGS. 3A-3D) are repeated as shown. Once all of the image frames 133a have been processed, the structure dimensioning system 119 moves to box 366 (FIG. 3E).

Figure 3E:
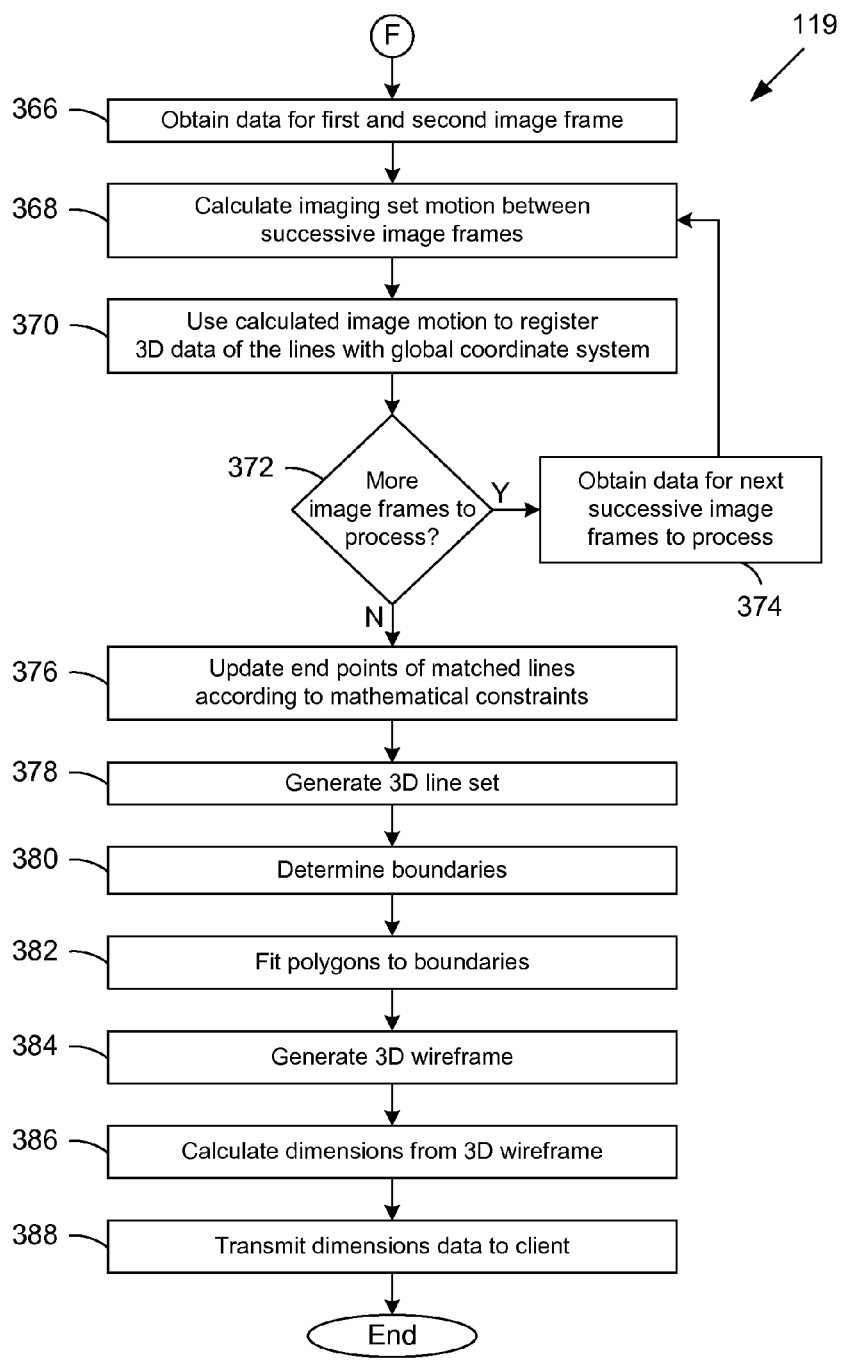

Referring now to FIG. 3E, the data for the first and second image frames 133a (FIG. 1) are obtained, as shown in box 366. Next, as depicted in box 368, the imaging set motion 157 (FIG. 1) from image frame 133a to its successive image frame 133a is calculated. The structure dimensioning system 119 then uses the calculated imaging set motion 157 to register three-dimensional data of the matched lines 149 with a global coordinate system, as shown in box 370.

The structure dimensioning system 119 then moves to box 372 and determines whether there are more image frames 133a to process. If so, the data for the next successive frames 133a is obtained, as shown in box 374. As a non-limiting example, if the first image frame 133a and second image frame 133a were processed, the data for the second image frame 133a and third image frame 133a may be obtained.

Once all of the image frames 133a have been processed, the endpoints of the matched lines 149 (FIG. 1) are adjusted, as shown in box 376. The matched lines 149 may be adjusted, for example, based at least in part on epipolar geometry, homography matrices, geometric considerations, and/or possibly other information.

Next, as shown in box 378, the structure dimensioning system 119 generates a 3D line set 159 (FIG. 1) from the lines 149. As described above, linear or non-linear triangulation methods and possibly other methods may be used to generated the 3D line set 159 from the lines 149. The structure dimensioning system 119 then moves to box 380 and determines the boundaries defined by the 3D line set 159. As shown in box 382, polygons are then fit to the boundaries.

As depicted in box 384, a 3D wireframe 163 (FIG. 1) of the structure 126 and/or scene 129 may be generated, and as-built dimensions 123 (FIG. 1) of the structure 126 (FIG. 1) may be determined from the 3D wireframe 163, as shown in box 386. In addition to or instead of determining the dimensions 123, a materials estimate for the structure 126 or a file for the fabrication device 176, for example, may be generated. The dimensions 123 and possibly other data may be transmitted to the client 196 (FIG. 1), as shown in box 388. Thereafter the process ends.

Figure 4:
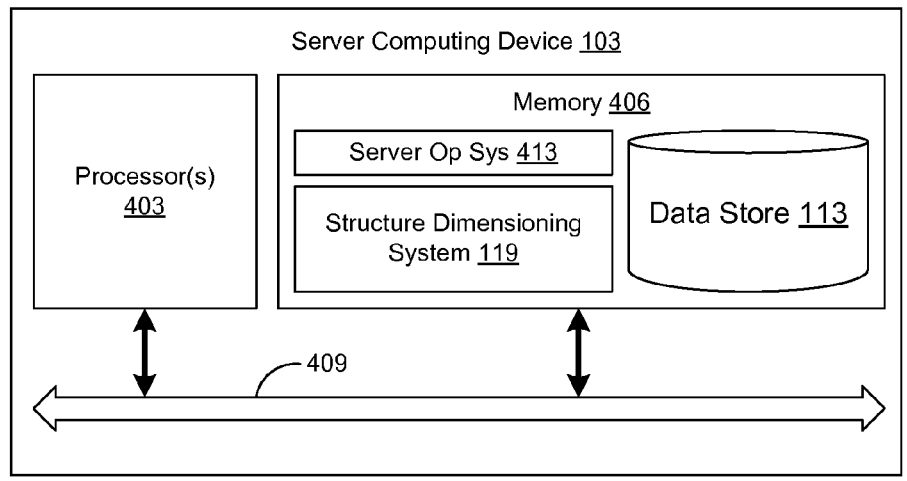
FIG. 4 is a schematic block diagram that provides one example illustration of a server computing device employed in the networked environment of FIG. 1 according to various embodiments of the present disclosure.

With reference to FIG. 4, shown is a schematic block diagram of the server computing device 103 according to an embodiment of the present disclosure. The server computing device 103 includes at least one processor circuit, for example, having a processor 403 and a memory 406, both of which are coupled to a local interface 409. To this end, the server computing device 103 may comprise, for example, at least one server computer or like device. The local interface 409 may comprise, for example, a data bus with an accompanying address/control bus or other bus structure, as can be appreciated.

Stored in the memory 406 are both data and several components that are executable by the processor 403. In particular, stored in the memory 406 and executable by the processor 403 is the structure dimensioning system 119, and potentially other applications. Also stored in the memory 406 may be a data store 113 and other data. In addition, a server operating system 413 may be stored in the memory 406 and executable by the processor 403.

Figure 5:
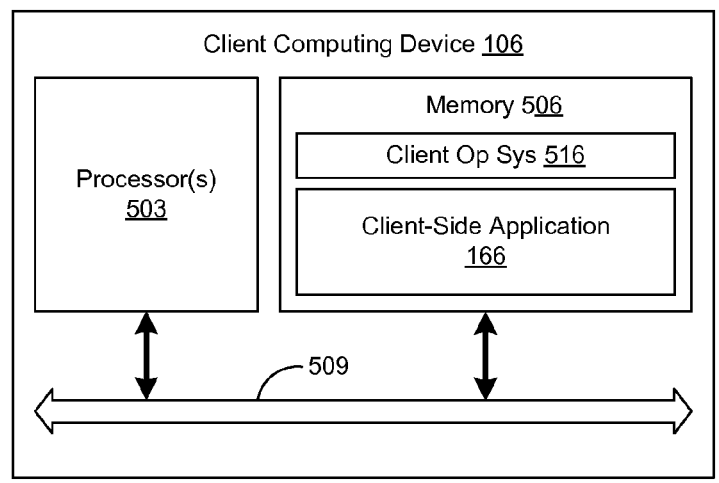
FIG. 5 is a schematic block diagram that provides one example illustration of a client computing device employed in the networked environment of FIG. 1 according to various embodiments of the present disclosure.

With reference to FIG. 5, shown is a schematic block diagram of the client computing device 106 according to an embodiment of the present disclosure. The client computing device 106 includes at least one processor circuit, for example, having a processor 503 and a memory 506, both of which are coupled to a local interface 509. To this end, the client computing device 106 may comprise, for example, a personal computer or like device. The local interface 509 may comprise, for example, a data bus with an accompanying address/control bus or other bus structure, as can be appreciated.

Stored in the memory 506 are both data and several components that are executable by the processor 503. In particular, stored in the memory 506 and executable by the processor 503 is the client-side application 166, and potentially other applications. In addition, a client operating system 516 may be stored in the memory 506 and executable by the processor 503.

With reference to FIGS. 4 and 5, it is understood that there may be other applications that are stored in the memories 406 and 506 and are executable by the processors 403 and 503, respectively, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 406 and 506 and are executable by the processors 403 and 503, respectively. In this respect, the term "executable" means a program file that is in a form that can ultimately be run by the processors 403 and 503. Examples of executable programs may be, for example, a compiled program that can be translated into machine code in a format that can be loaded into a random access portion of the memories 406 and 506 and run by the processors 403 and 503, respectively, source code that may be expressed in proper format such as object code that is capable of being loaded into a random access portion of the memories 406 and 506 and executed by the processors 403 and 503, respectively, or source code that may be interpreted by another executable program to generate instructions in a random access portion of the memories 406 and 506 to be executed by the processors 403 and 503, respectively, etc. An executable program may be stored in any portion or component of the memories 406 and 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406 and 506 are defined herein as including both volatile and nonvolatile memory and data storage components. Volatile components are those that do not retain data values upon loss of power. Nonvolatile components are those that retain data upon a loss of power. Thus, the memories 406 and 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403 and 503 may represent multiple processors 403 and 503, respectively, and the memories 406 and 506 may represent multiple memories 406 and 506, respectively, that operate in parallel processing circuits, respectively. In such a case, the local interfaces 409 and 509 may be an appropriate network 109 (FIG. 1) that facilitates communication between any two of the respective multiple processors 403 and 503, between each processor 403 and 503 and any of the memories 406 and 506, or between any two of the memories 406 and 506, etc. Each local interface 409 and 509 may comprise additional systems designed to coordinate this communication, including, for example, performing load balancing. The processors 403 and 503 may be of electrical or of some other available construction.

Although the structure dimensioning system 119, client-side application 166, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-3E show the functionality and operation of an implementation of portions of the structure dimensioning system 119 and client-side application 166. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 and 503 in a computer system or other system. The machine code may be converted from the source code, etc. If embodied in hardware, each block may represent a circuit or a number of interconnected circuits to implement the specified logical function(s).

Although the flowcharts of FIGS. 2-3E show a specific order of execution, it is understood that the order of execution may differ from that which is depicted. For example, the order of execution of two or more blocks may be scrambled relative to the order shown. Also, two or more blocks shown in succession in FIGS. 2-3E may be executed concurrently or with partial concurrence. Further, in some embodiments, one or more of the blocks shown in FIGS. 2-3E may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the structure dimensioning system 119 and client-side application 166, that comprises software or code can be embodied in any non-transitory computer-readable medium for use by or in connection with an instruction execution system such as, for example, a processor 403 and 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program executable in a computing device, the program comprising:
   code that obtains a stream of image frames depicting a structure in a scene, the stream of image frames comprising a plurality of first image frames corresponding to a first imaging device and a plurality of second image frames corresponding to a second imaging device;
   code that identifies a plurality of edge pixels in a plurality of the image frames;
   code that identifies a plurality of groups of the edge pixels;
   code that identifies a plurality of preliminary lines based at least in part on the groups of the edge pixels;

code that shortens the preliminary lines to thereby create a plurality of line segments;

code that extends the line segments to thereby create a plurality of extended line segments;

code that combines a plurality of the line segments to thereby create a plurality of lines;

code that identifies a plurality of potential planes in a plurality of the image frames;

code that matches a plurality of the lines for the first image frames with a plurality of the lines for the second image frames based at least in part on the potential planes to thereby identify a plurality of matched lines;

code that identifies a camera set motion for the image frames; and code that generates a wireframe for at least a portion of the structure based at least in part on the matched lines and the camera set motion.

2. The non-transitory computer-readable medium of claim 1, wherein the program further comprises code that identifies a plurality of as-built dimensions for the structure based at least in part on the wireframe.

3. The non-transitory computer-readable medium of claim 1, wherein the program further comprises code that generates a materials estimate for the structure based at least in part on the wireframe.

4. The non-transitory computer-readable medium of claim 1, wherein the program further comprises code that generates data for a fabrication device based at least in part on the wireframe.

5. A system, comprising:
at least one computing device; and
a structure dimensioning system executable in the at least one computing device, the structure dimensioning system comprising:
   logic that obtains a stream of image frames depicting a structure in a scene, the stream of image frames comprising a plurality of first image frames corresponding to a first imaging device and a plurality of second image frames corresponding to a second imaging device;
   logic that generates a plurality of two-dimensional (2D) lines for at least a portion of the structure;
   logic that generates a plurality of three-dimensional (3D) lines using at least a subset of the 2D lines, the 3D lines representing a plurality of physical edges depicted in the stream of image frames;
   logic that identifies an imaging set motion for the stream of image frames;
   logic that adjusts the 3D lines based at least in part on the imaging set motion to thereby generate a plurality of adjusted 3D lines; and
   logic that generates a wireframe of at least a portion of the structure using at least a subset of the adjusted 3D lines.

6. The system of claim 5, wherein the structure dimensioning system further comprises logic that identifies a plurality of as-built dimensions for the structure based at least in part on the wireframe.

7. The system of claim 5, wherein the structure dimensioning system further comprises logic that generates a materials estimate for the structure based at least in part on the wireframe.

8. The system of claim 5, wherein the structure dimensioning system further comprises logic that generates data for a fabrication device based at least in part on the wireframe.

9. The system of claim 5, wherein the structure dimensioning system further comprises:

logic that identifies a plurality of edge pixels in at least a portion of the stream of image frames;

logic that identifies a plurality of groups of the edge pixels;

logic that identifies a plurality of preliminary lines based at least in part on the groups of the edge pixels; and logic that generates the 2D lines based at least in part on at least a subset of the preliminary lines.

10. The system of claim 9, wherein the structure dimensioning system further comprises:

logic that shortens the preliminary lines to thereby create a plurality of line segments;

logic that extends the line segments based at least in part on a criteria to thereby create a plurality of extended line segments; and logic that combines at least a subset of the extended line segments to thereby create the 2D lines.

11. The system of claim 5, wherein the structure dimensioning system further comprises:

logic that identifies a plurality of potential planes in at least a subset of the image frames; and logic that generates the wireframe of at least the portion of the structure based at least in part on the potential planes.

12. A method, comprising:

obtaining, in at least one computing device, a stream of image frames depicting a structure in a scene, the stream of image frames comprising a plurality of first image frames corresponding to a first imaging device and a plurality of second image frames corresponding to a second imaging device;

generating, in the at least one computing device, a plurality of two-dimensional (2D) lines for at least a portion of the structure;

generating, in the at least one computing device, a plurality of three-dimensional (3D) lines using at least a subset of the 2D lines, the 3D lines representing a plurality of physical edges depicted in the stream of image frames;

identifying, in the at least one computing device, an imaging set motion for the stream of image frames;

adjusting, in the at least one computing device, the 3D lines based at least in part on the imaging set motion to thereby generate a plurality of adjusted 3D lines; and generating, in the at least one computing device, a wireframe of at least a portion of the structure using at least a subset of the adjusted 3D lines.

13. The method of claim 12, further comprising identifying a plurality of as-built dimensions for the structure based at least in part on the wireframe.

14. The method of claim 12, further comprising generating a materials estimate for the structure based at least in part on the wireframe.

15. The method of claim 12, further comprising generating data for a fabrication device based at least in part on the wireframe.

16. The method of claim 12, further comprising:

identifying a plurality of edge pixels in at least a portion of the stream of image frames;

identifying a plurality of groups of the edge pixels;

identifying a plurality of preliminary lines based at least in part on the groups of the edge pixels; and generating the 2D lines based at least in part on at least a subset of the preliminary lines.

17. The method of claim 16, wherein the groups of edge pixels are grouped based at least in part on a plurality of gradient angles associated with the edge pixels.

18. The method of claim 16, further comprising:

- shortening, in the at least one computing device, the preliminary lines to thereby create a plurality of line segments;
- extending, in the at least one computing device, the line segments based at least in part on a criteria to thereby create a plurality of extended line segments; and
- combining, in the at least one computing device, at least a subset of the extended line segments to thereby create the 2D lines.

19. The method of claim 18, wherein the criteria for extending the line segments comprises a gradient angle threshold.

20. The method of claim 12, wherein generating the wireframe of at least a portion of the structure further comprises:

- identifying a plurality of potential planes for a plurality of the image frames; and
- generating the wireframe of at least a portion of the structure based at least in part on the potential planes.

\* \* \* \* \*